INVENTORS: H. INOSE
T. SAITO
BY R.C. Winter
ATTORNEY

NETWORK SYNCHRONIZATION IN A TIME DIVISION SWITCHING SYSTEM

Filed Jan. 3, 1968

3 Sheets-Sheet 3

United States Patent Office 3,504,126
Patented Mar. 31, 1970

3,504,126

NETWORK SYNCHRONIZATION IN A TIME DIVISION SWITCHING SYSTEM

Hiroshi Inose and Tadao Saito, Tokyo, Japan, assignors to Bell Telephone Laboratories, Incorporated, Murray Hill, N.J., a corporation of New York Filed Jan. 3, 1968, Ser. No. 695,426
Claims priority, application Japan, May 22, 1967, 42/32,102, 42/32,103
Int. Cl. H04j 3/06
U.S. Cl. 179—15 6 Claims

ABSTRACT OF THE DISCLOSURE

Mutual synchronization of operations performed in scattered locations remote from one another is disclosed in the environment of a communication system having switching centers interconnected on a time division multiplex basis for transmission of coded information. The phases of synchronization signals received from other centers at a fixed frame rate are compared individually with locally generated signals and the comparison resultants utilized to correct the frequency and phase of the local generator. Phase deviations due to transmission delays between centers are overcome by transmitting synchronization signals at different frequencies dependent upon the relative distances between centers.

BACKGROUND OF THE INVENTION

The operational timing control problem in a communication system having widely scattered switching centers which are interconnected on a time division multiplex basis may be solved by designating a particular center as the master clock source for the timing of operations throughout the system. Slave clocks in each of the other centers which direct the timing control only in the corresponding center then are constrained to have the same timing frequency as that originating at the master center.

This master-slave relationship for timing control has several disadvantages arising primarily from the varying transmission characteristics between the master center and each of the slave centers. Also of primary concern in a communication system which cannot afford long out-of-service intervals, a device failure occurring in the master timing control or in one or more of the transmission links between the master center and the slave centers may be catastrophic. Apparatus required to safeguard against or correct for such a failure is exceedingly complex and not completely fail safe regardless of the precautions taken.

An alternate approach which has proven feasible is designated as mutual synchronization. This approach abandons the master-slave or autocratic relationship in favor of a democratic approach in which each switching center of the network influences the timing of the entire network as much as any of the others but no more. Thus the frequency of the timing wave originating at a particular switching center has a like influence on the frequencies of timing waves originating at each of the other switching centers in determining the ultimate frequency of the timing wave that synchronizes the entire network. An arrangement of this type is described in H. Inose et al. patent application Ser. No. 603,982, filed Dec. 22, 1966, now Patent 3,483,330, issued Dec. 9, 1969.

According to the cited Inose et al. arrangement, the phase of a synchronization signal received from each of the other centers is compared with the phase of the synchronization signal generated at the local center, and the sum of the error signals produced by the phase comparing circuits is utilized to adjust the frequency of the locally generated signals. This arrangement is particularly effective in systems in which the interconnected centers are in close proximity. The synchronization signal comprises a sequence of pulses which are transmitted in a distinct time channel at repetitive fixed frame intervals. The effect of transmission delay between centers then is substantially overcome by adjusting the delay to be an integral multiple of the frame interval.

In such confined systems any deviation from the adjusted value is so slight as not to influence the system frequency. When, however, the distance between centers is increased substantially, this adusted delay deviation may increase to a level which seriously affects the system frequency unless otherwise regulated.

SUMMARY OF THE INVENTION

In systems including widely separated centers, as well as centers in close proximity, transmission delays between centers may fluctuate to such an extent that deviations from the expected delay produce a cycle slip. In this event information transmitted between centers in the slipped cycle may be lost. Such a loss is avoided in accordance with this invention by transmitting the synchronization signal between widely separated centers at a substantially lower frequency than is utilized for such signals transmitted between centers within a predetermined range. The delay deviation which is required to produce a cycle slip, of course, will increase in proportion to the reduction in the transmission frequency. Thus by judicious selection of the transmission frequency, according to the distance between centers, cycle slip may be eliminated. Furthermore, transmission of all synchronization signals at frequencies which are integral multiples of each other will permit the synchronization signals from all centers to be utilized in the phase comparison operation to stabilize the local oscillator at each center.

DRAWING

DETAILED DESCRIPTION

Figure 1:
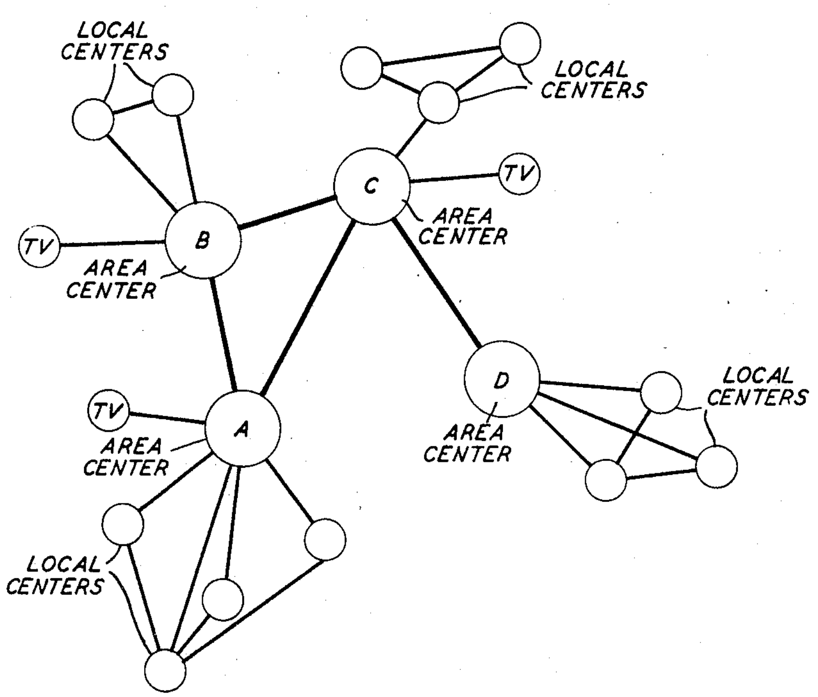
FIG. 1 is a schematic representation of a network of interlinked time division switching centers in which the arrangement in accordance with this invention may be employed.

Referring now to the drawing, FIG. 1 illustrates a network of area and local switching centers in which the illustrative embodiment of this invention may be utilized. Each area switching center, represented by a large circle and a letter designation, is connected with the other area centers via long haul, two-way communication highways represented in FIG. 1 by heavy lines. Local centers switching voice and data signals and television terminals in turn are connected to an area center and to each other via short haul highways represented by finer lines. Thus center A, for example, switches television signals and handles long haul traffic for four local centers. It is contemplated that in practice the network may be many times as large as that shown and may encompass hundreds or even thousands of switching centers and local offices.

The system employs a variety of signal types transmitted at unique frequencies. Thus in this illustrative embodiment the short haul synchronization signal is transmitted at 8 kHz. while the long haul synchronization signal is transmitted at 40 Hz. Information, such as coded voice or data, is transmitted at a bit rate of 1.544 megahertz and television signals at 111.168 megahertz. Advantageously all of these signals are transmitted at frequencies which are integral multiples of one another. The total bit rate on each highway is 222.336 megahertz.

Figure 3:
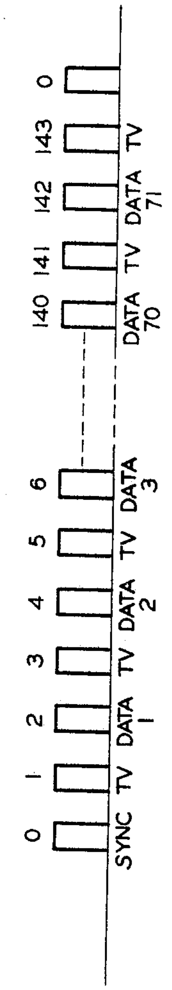
FIG. 3 depicts the content of a typical frame of information transmitted between centers.

As illustrated in FIG. 3, the highway between centers A and B, FIG. 1, might contain one television signal, which occupies half the highway capacity, 71 speech or data signals and one synchronization signal. The 8 kHz. synchronization signal defines what may be termed a minor frame, each of which contains 144 time slots occupied by the signal bits being transmitted. Thus the minor frame, defined by synchronization signals in time slot O, is occupied by a television signal in time slots 1, 3, 5 . . . 143, and by speech or data signals representing 71 distinct call connections in time slots 2, 4, 6 . . . 142.

Considering the diverse transmission range in a large system, the amount of deviation from the expected delay between widely separated centers may be sufficient to cause the loss of an entire minor frame. This loss is avoided in accordance with this embodiment of the invention by transmitting the synchronization signal between the widely separated area centers at a slower rate than is utilized between the local centers which are in close proximity. Thus a frequency of 40 Hz. is chosen for the transmission of synchronization signals between area centers, as contrasted with the 8 kHz. rate utilized between local centers. The 40 Hz. major frame rate is an integral multiple (200) of the 8 kHz. minor frame rate. This permits the phase comparison in each area center to involve the 40 Hz. signal once in every 25 milliseconds, while the comparison in every minor or 125 microsecond frame involves only the 8 kHz. signals. This means, of course, that a delay deviation of up to 12.5 milliseconds can be tolerated for long haul transmission before a cycle slip occurs, as compared with the maximum deviation of 62.5 microseconds permitted before cycle slip occurs at the short haul synchronization signal rate. The system in accordance with this embodiment thus provides synchronization at the 40 Hz. rate between area centers and at the 8 kHz. rate between local centers and between local and area centers.

The 40 Hz. signal does not require precise phase synchronization. However, to stabilize the operating point of the phase comparator, rough phase synchronization is needed. It would be impractical to adjust each transmission delay to be an integral multiple of the 40 Hz. period, since this could result in intolerable system delay. Thus, in accordance with this embodiment, the transmission delay to accommodate the 40 Hz. synchronization signal is adjusted so as to be an integral multiple of the 8 kHz. frame synchronization rate.

Figure 4:
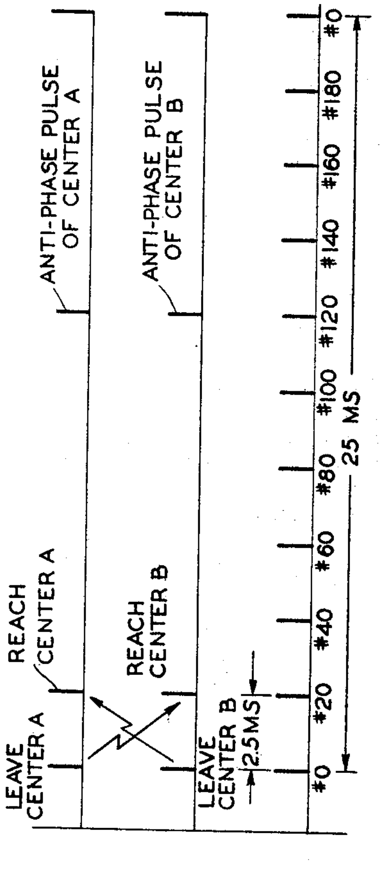
FIG. 4 is a representation of the timing involved in the transmission of synchronization signals throughout the system.

FIG. 4 is a timing chart depicting the general scheme for phase adjustment between centers A and B during a major frame. The designations on the top line illustrate the time at which the synchronization signal is transmitted from center A, the time at which the synchronization signal from center B is received at center A, and a locally generated signal, designated the anti-phase pulse. The middle line illustrates the same signals with respect to center B. The bottom line illustrates the composition of the 25 millisecond major frame defined by the 40 Hz. synchronization signals. The 200 minor frames included in one major frame, each having a 125 microsecond duration, are illustrated in groups of 20, each group having a duration of 2.5 milliseconds. It is assumed in this example, that the delay encountered between area centers A and B is 2.5 milliseconds or 20 minor frames. Thus a signal generated at center A at time O will reach center B 2.5 milliseconds later, or at the end of minor frame 20. A similar delay is encountered by signals generated at center B and transmitted to center A. This amount of delay corresponds to a distance of approximately 500 kilometers.

The anti-phase pulses are provided by the respective terminating centers at the end of the 120th frame which allows for the maximum operating range in the phase comparator of the terminating center. Any unusual deviation about the expected time for receipt of the synchronization signal in center A or B will be corrected so long as it does not exceed 12.5 milliseconds; i.e., the time between the expected receipt of a synchronization signal and the occurrence of the anti-phase pulse. It may be of interest to compare this allowable deviation before a cycle slip occurs with systems utilizing only 8 kHz. synchronization in which the maximum allowable deviation is 62.5 microseconds.

Figure 2:
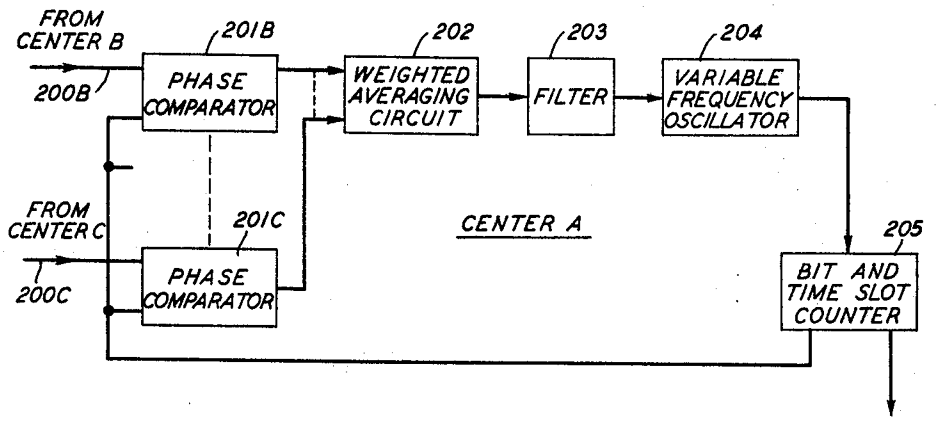
FIG. 2 is a schematic representation in block diagram form of the basic frequency synchronization equipment provided at each of the switching centers in the system depicted in FIG. 1.

In a mutual synchronization system, as disclosed in the aforementioned Inose et al. system, each of the centers is provided with a frequency synchronization arrangement basically as illustrated in FIG. 2. Each center thus contains as many phase comparators 201B, 201C as the centers to which it is connected. Considering the arrangement illustrated in FIG. 2 as representing the frequency synchronization unit for center A, FIG. 1, frame pulses from centers B and C are applied via leads 200B and 200C respectively to phase comparators 201B and 201C for subsequent comparison with the locally generated frame pulse obtained from bit and time slot counter 205. A weighted averaging circuit 202 adds together the outputs of the phase comparators and transmits the resultant error signal through filter 203 to adjust variable frequency oscillator 204. Bit and time slot counter 205 in turn counts down the oscillator output to provide the desired operational timing signals for local control and intercenter synchronization.

Figure 5:
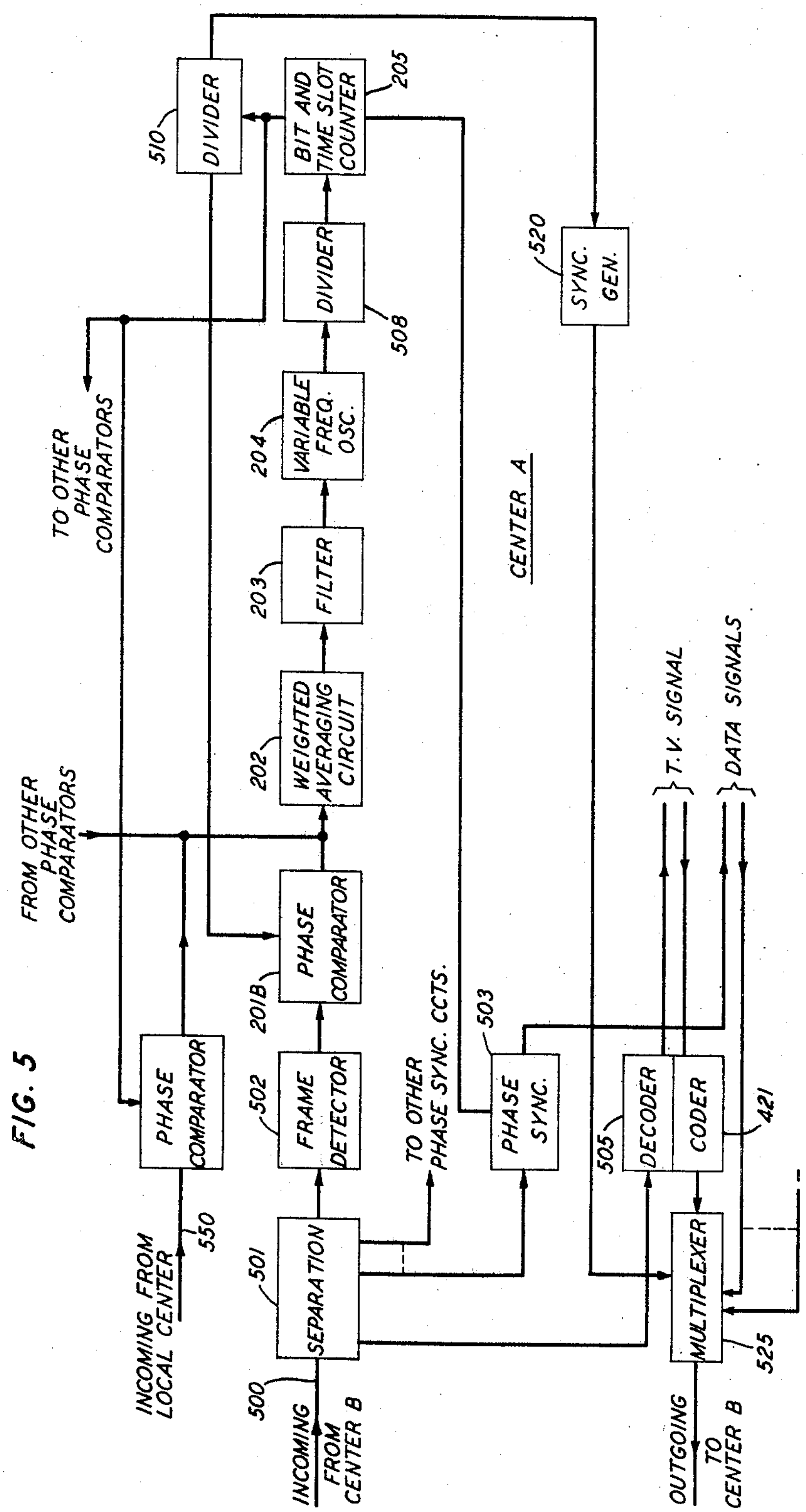
FIG. 5 is a schematic representation of variations in the frequency synchronization equipment depicted in FIG. 2 in accordance with one embodiment of this invention.

Certain aspects of the mutual synchronization operation, in accordance with this illustrative embodiment, are depicted in FIG. 5 with particular reference to centers A and B. Thus the synchronization arrangement at center A receives signals from center B including the major frame synchronization signal via time division multiplex transmission highway 500, representing a plurality of such highways as may be required to carry all of the desired communication between the two centers. Information including the minor frame synchronization signal is received from a local center on highway 550. Information from other centers is applied to other phase comparators as indicated.

Bit and time slot counter 205 receives a 222.335 megahertz signal from oscillator 204. From this signal, the various required bit and time slot defining signals are derived. Information is coded in PCM form, e.g., each data and synchronization signal consists of eight bits and each television signal nine bits. Each signal is included in a time slot assigned to the particular source. The composition of a minor frame of information received from center B on highway 500 may be as illustrated in FIG. 3. Separation circuit 501, as its name implies, separates the incoming signals and directs them to the proper equipment for processing. Thus the 40 Hz. synchronization signal is transmitted to frame detector 502, the television signal is directed to decoder 505 and one of the data signals is processed through phase synchronization circuit 503. The outgoing signal to center B in turn comprises the major frame synchronization signal providet at the 40 Hz. rate by synchronization generator 520, a television signal processed through coder 521, and the data signals combined with the other signals in multiplexer 525. Outgoing signals to local centers may include similar data accompanied by the minor frame synchronization signal.

The equipment for processing the balance of the data signals is not shown in FIG. 5.

Frame detector 502 recognizes the synchronization pattern and includes delay apparatus for adjusting the arrival time to the nearest minor frame interval. An indication of the exact demarcation between successive major frames is applied to the corresponding phase comparator 201B, which may comprise a simple flip-flop circuit having this indication as its reset input. The control or toggle input to this flip-flop is the anti-phase, FIG. 4 received from divider 510 once per major frame in the precise time slot, bit and phase at which the demarcation between successive minor frames occurs in the area center. It is derived from the 8 kHz. minor frame signal generated by bit and time slot counter 205. This anti-phase pulse, which serves to change the existing state of the flip-flop, is applied to phase comparator 201B 180° out of phase with the adjusted incoming synchronization signal. It is also transmitted to generator 520 to trigger the production of the outgoing synchronization signal. The 8 kHz. minor frame signal is also transmitted to the other phase comparators 180° out of phase with the incoming local center synchronization signals.

The resultant error signal at the output of phase comparator 201B is combined with the error signals from all other major and minor frame phase comparators in weighted averaging circuit 202 and utilized after filtering to correct the frequency of oscillator 204. Divider 508 then provides the various signals required for all other system timing functions by counter 205.

It is to be understood that the above-described arrangement is illustrative of the application of the principles of the invention. Numerous other arrangements may be devised by those skilled in the art without departing from the spirit and scope of the invention.

What is claimed is:

1. In a time division multiplex communication system comprising a plurality of widely scattered interconnected control centers, means in each center for overcoming the effects of intercenter transmission delay on the mutual synchronization of operational timing comprising means for comparing the phase of a synchronization signal received from a distant center at a first frequency and the phase of a synchronization signal received from a nearby center at a second frequency with the phase of an internally generated synchronization signal, means for combining the output of said phase comparing means, and means for adjusting the frequency of said synchronization signal in accordance with the output of said combining means, said first and second frequencies being integral multiples of one another.

2. A communication system comprising a plurality of interconnected control centers, means at each center for establishing and maintaining synchronization among all of the centers comprising means for defining a sequence of time slots in repetitive minor and major frame intervals, means for generating a synchronization signal, means for transmitting said synchronization signal to each of the other centers in a distinct time slot to define said frame intervals, means for detecting the synchronization signal received from each of the other centers, means for comparing the phase of each detecting means output signal with the phase of the locally generated synchronization signal, means for avoiding errors due to the amount of transmission delay encountered by signals received from widely scattered centers comprising means for transmitting said synchronization signals to centers in close proximity at the repetition rate of said minor frame interval and to distant centers at the repetition rate of said major frame interval, and means for adjusting the frequency of signals generated by said time slot defining means in accordance with the sum of the error signals produced by said phase comparing means.

3. A communication system in accordance with claim 2 further comprising means for adjusting the time of arrival of said synchronization signal transmitted in said major frame interval to be an integral multiple of said minor frame interval.

4. A circuit arrangement for overcoming the effects of intercenter transmission delay on the mutual synchronization of operational timing in a communication system comprising a plurality of widely scattered control centers each having frequency synchronization unit including means for comparing the phase of a synchronization signal received from each of the interconnected centers with the phase of the locally generated synchronization signal, characterized in that the synchronization signal is received from distant centers at a different frequency than that at which the synchronization signal is received from centers in close proximity.

5. A circuit arrangement in accordance with claim 4 characterized in that the synchronization signal is transmitted between remote centers at a frame rate which is an integral multiple of the frame rate at which the synchronization signal is transmitted between centers in close proximity.

6. A circuit arrangement in accordance with claim 4 characterized in that the time of arrival of said synchronization signal received from a distant center is adjusted to be an integral multiple of the time of arrival of said synchronization signal received from a center in close proximity.

References Cited

UNITED STATES PATENTS

| | | | |
|---|---|---|---|
| 3,050,586 | 8/1962 | Runyon | 179—15 |
| 3,437,755 | 4/1969 | Brown | 179—15 |

KATHLEEN H. CLAFFY, Primary Examiner

A. B. KIMBALL, Jr., Assistant Examiner